(12) United States Patent
Hirakata et al.

(10) Patent No.: US 8,722,294 B2
(45) Date of Patent: May 13, 2014

(54) BAROPLASTIC, RESIN COMPOSITION, ELECTROSTATIC-IMAGE-DEVELOPING TONER, ELECTROSTATIC IMAGE DEVELOPER, TONER CARTRIDGE, PROCESS CARTRIDGE, IMAGE FORMING APPARATUS AND IMAGE FORMING METHOD

(75) Inventors: Masaki Hirakata, Kanagawa (JP); Fumiaki Mera, Kanagawa (JP); Hirofumi Shiozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 654 days.

(21) Appl. No.: 12/776,074

(22) Filed: May 7, 2010

(65) Prior Publication Data
US 2011/0020743 A1 Jan. 27, 2011

(30) Foreign Application Priority Data

Jul. 27, 2009 (JP) .................................. 2009-174554
Jan. 27, 2010 (JP) .................................. 2010-015847

(51) Int. Cl.
*G03G 9/09* (2006.01)
*G03G 9/093* (2006.01)
*G03G 13/06* (2006.01)
*C08G 16/00* (2006.01)

(52) U.S. Cl.
USPC ................. 430/109.1; 528/245.3; 430/124.13

(58) Field of Classification Search
USPC ............. 430/109.1, 124.13, 124.1; 528/245.3
See application file for complete search history.

(56) References Cited

U.S. PATENT DOCUMENTS

| 5,418,102 | A  | * | 5/1995  | Kotaki et al. ............... 430/109.3 |
| 2003/0165766 | A1 | * | 9/2003  | Zhang et al. .................... 430/124 |
| 2005/0244736 | A1 | * | 11/2005 | Yon et al. ........................ 430/115 |
| 2007/0073000 | A1 |   | 3/2007  | Mayes et al. |
| 2007/0092823 | A1 |   | 4/2007  | Matsumura et al. |
| 2009/0053631 | A1 |   | 2/2009  | Matsumura |
| 2011/0020030 | A1 | * | 1/2011  | Mera et al. ..................... 399/111 |

FOREIGN PATENT DOCUMENTS

| AU | 2006235981 A1 | 12/2007 |
| JP | A-49-91231    | 8/1974  |
| JP | A-56-40868    | 4/1981  |
| JP | A-2006-516299 | 6/2006  |
| JP | A-2007-114635 | 5/2007  |
| JP | A-2007-310064 | 11/2007 |
| JP | A-2007-322953 | 12/2007 |
| JP | A-2009-53318  | 3/2009  |

* cited by examiner

*Primary Examiner* — Jonathan Jelsma
(74) *Attorney, Agent, or Firm* — Oliff PLC

(57) ABSTRACT

A baroplastic includes a first resin with a first Tg; and a second resin with a second Tg that is lower than the first Tg by 20° C. or more, and has a photoreactive group.

18 Claims, 1 Drawing Sheet

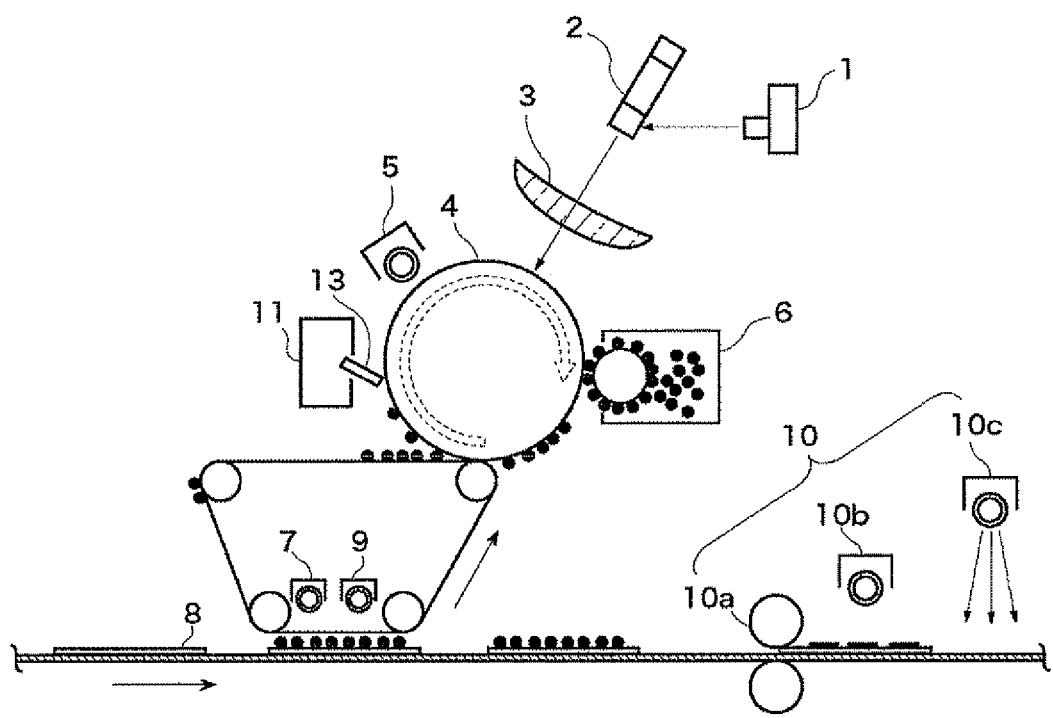

BAROPLASTIC, RESIN COMPOSITION, ELECTROSTATIC-IMAGE-DEVELOPING TONER, ELECTROSTATIC IMAGE DEVELOPER, TONER CARTRIDGE, PROCESS CARTRIDGE, IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2009-174554 filed on Jul. 27, 2009, and Japanese Patent Application No. 2010-015847 filed on Jan. 27, 2010.

BACKGROUND

1. Technical Field

The present invention relates to a baroplastic, a resin composition, an electrostatic-image-developing toner, an electrostatic image developer, a toner cartridge, a process cartridge, an image forming apparatus and an image forming method.

2. Related Art

A baroplastic is composed of a polymer which is hard at ordinary temperature (whose glass transition temperature (Tg) is high; hereinafter also referred to as "high Tg") and a polymer which is soft at ordinary temperature (whose Tg is low; hereinafter also referred to as "low Tg"), and it is reported that in a certain combination, the baroplastic has properties such that it reveals fluidity under pressure.

SUMMARY

According to an aspect of the invention, there is provided a baroplastic including: a first resin with a first Tg; and a second resin with a second Tg that is lower than the first Tg by 20° C. or more, the baroplastic having a photoreactive group.

BRIEF DESCRIPTION OF THE DRAWINGS

Exemplary embodiment(s) of the present invention will be described in detail based on the following FIGURE, wherein:

FIG. 1 is a configuration conceptual view of an example of an image forming apparatus according to the present exemplary embodiment, wherein 1 denotes Semiconductor laser light source, 2 denotes Polygon mirror, 3 denotes fθ lens, 4 denotes Image holding member, 5 denotes Charge unit, 6 denotes Development unit, 7 denotes Transfer unit, 8 denotes Image support (transfer-receiving material), 9 denotes Separation unit (separation electrode), 10 denotes Fixing unit, 10a denotes Pressure roller, 10b denotes Unit of feeding photocurable components (polymerizable compound and photopolymerization initiator), 10c denotes Irradiation unit, 11 denotes Cleaning unit, and 13 denotes Cleaning blade.

DETAILED DESCRIPTION

1. Baroplastic:

The baroplastic according to the present exemplary embodiment is characterized by having a photoreactive group. The baroplastic is preferably one including a first resin with a first Tg (glass transition temperature) and a second resin with a second Tg that is lower than the first Tg by 20° C. or more. The baroplastic according to the present exemplary embodiment is hereunder described in detail. In this specification, the terms "from A to B" or the like expressing a numerical value range are synonymous with "A or more and not more than B". Also, the Tg is a value measured in a method defined in ASTM D3418-82 when the measurement is performed at a temperature rising rate of 10° C./min from −80° C. to 150° C. using a differential scanning calorimeter (DSC).

The baroplastic according to the present exemplary embodiment is a resin which is a combination of the first resin and the second resin and in which the first resin and the second resin form a micro phase separation state. The baroplastic in which such a micro phase separation state is formed reveals a plastic behavior against pressure.

The pressure plasticity which is a characteristic feature of the baroplastic is derived from the micro phase separation state which is one of requirements for revealing characteristics thereof. For that reason, it is grasped that the pressure plasticity which is a characteristic of the baroplastic is not revealed depending upon a ratio of the first resin and the second resin each constituting the baroplastic. The baroplastic according to the present exemplary embodiment has a photoreactive group. With this photoreactive group as a beginning, by allowing either one of the first resin or the second resin to react selectively, the pressure plasticity can be made to disappear through shifting of the ratio of the first resin and the second resin.

Also, in order to obtain a high physical strength after curing, it is preferable that the photoreactive group is introduced into the first resin.

As the photoreactive group, a group capable of causing a curing reaction upon being irradiated with active radiations is preferable, and specific examples thereof include a group capable of causing photodimerization and a group capable of causing photopolymerization. As the group capable of causing photodimerization, a cinnamate residue can be exemplified. The group capable of causing photopolymerization is an addition polymerizable reactive group which is used through a combination with a photopolymerization initiator and which is capable of being polymerized with a polymerization initiation species emitted from the photopolymerization initiator. As the photopolymerization initiator, a compound which absorbs active radiations to emit a radical polymerization initiation species or a cationic polymerization initiation species is included. The addition polymerizable reactive group is not limited with respect to a reaction mechanism thereof, and examples thereof include groups having a radical polymerizable ethylenically unsaturated group, a cationic polymerizable epoxy group or an oxetanyl group. In the present exemplary embodiment, the photoreactive group is preferably a group having a radical polymerizable ethylenically unsaturated group.

Examples of the group having an ethylenically unsaturated group include a (meth)acryloyloxy group, a (meth)acrylamide group and a vinyl group (the term "(meth)acryloyl" or the like is synonymous with "methacryloyl" and/or "acryloyl"; hereinafter the same).

The Tg of the first resin is preferably in the range of from 45° C. to 200° C., more preferably in the range of from 60° C. to 200° C., and further preferably in the range of from 90° C. to 200° C. In the case where the Tg of the first resin falls within the foregoing numerical value range, when the baroplastic is used as a binder resin of a toner, storage properties of the toner are excellent, caking or filming onto a photoconductor (image holding member) is hardly generated, and an image quality defect is hardly caused as compared with the case where the Tg of the first resin falls outside the foregoing numerical value range.

The Tg of the second resin is lower than the Tg of the first resin by preferably 20° C. or more, more preferably 30° C. or more, and further preferably 40° C. or more. In the case where the Tg of the second resin falls within the foregoing numerical value range, when the baroplastic is used as a binder resin of a toner, a pressure plasticization behavior is excellent, and a fixing temperature and a fixing pressure are low as compared with the case where the Tg of the second resin falls outside the foregoing numerical value range.

The baroplastic according to the present exemplary embodiment is preferably one which satisfies the relationship represented by the following expression (1).

$$20° C. \leq \{T(1\ MPa) - T(30\ MPa)\}° C. \quad (1)$$

In the expression (1), T(1 MPa) represents a temperature at which a viscosity reaches $10^4$ Pa·s under an impressed pressure of flow tester of 1 MPa; and T(30 MPa) represents a temperature at which a viscosity reaches $10^4$ Pa·s under an impressed pressure of flow tester of 30 MPa.

When the relationship of the expression (1) is satisfied, a sufficient plasticization behavior due to pressurization is indicated.

Here, the flow tester measurement condition is as follows.

A softening state when the temperature is raised at an equal rate using a flow tester CFT-500A, manufactured by Shimadzu Corporation under conditions at from 19° C. as a starting temperature to 170° C. as a maximum temperature at a temperature rising rate of 3° C./min for a preheating time of 300 seconds while varying a cylinder pressure at from 1 MPa (10 kgf/cm$^2$) to 30 MPa (300 kgf/cm$^2$) using a die (L×D=1.0 mm×1.0 mm) is measured. Regarding a sample, with respect to the toner, in the case where it is difficult to aliquot only a resin of the toner, the toner per se is used as a sample upon being weighed. A sectional area of a plunger is set to be 10 cm$^2$. After starting the measurement, as the temperature is raised at an equal rate, the sample is gradually heated and starts to flow out. When the temperature is further raised, the sample which has become in a molten state flows out largely, and the downward movement of the plunger is stopped, thereby finishing the measurement of one time. The outflow at each temperature is measured at intervals of 3 minutes at from 19° C. to 170° C., thereby obtaining an apparent viscosity η' (Pa·s). On that occasion, at each of an impressed pressure of the flow tester of 1 MPa (10 kg/cm$^2$) and an impressed pressure of the flow tester of 30 MPa (300 kg/cm$^2$), a temperature at which the apparent viscosity η' (Pa·s) reaches $1 \times 10^4$ Pa·s is determined, and a difference therebetween is computed.

Examples of the combination of the first resin and the second resin include the following (A) to (C).

(A) A block copolymer having a block of the first resin and a block of the second resin;

(B) A resin composed of aggregated resin particles having a core-shell structure in which the first resin constitutes a core or a shell, and the second resin constitutes a shell or a core; and (C) A resin mixture in which the first resin and the second resin constitute a sea-island structure.

In the present exemplary embodiment, the block copolymer (A) is preferable.

In the present exemplary embodiment, it is preferable that the first resin and the second resin account for 60% by weight or more of the block copolymer; it is more preferable that the first resin and the second resin account for from 80% by weight to 100% by weight of the block copolymer; and it is further preferable that the copolymer is a block copolymer composed of the block of the first resin and the block of the second resin.

Also, as a ratio of the block of the first resin and the block of the second resin, when the total weight of the block copolymer is defined as 100% by weight, it is preferable that a proportion for which the block of the first resin accounts is from about 25% by weight to about 75% by weight.

As each of the blocks of the copolymer, an addition polymerization based resin and a polycondensation based resin are preferably utilized. Examples of the addition polymerization based resin include homopolymers or copolymers of an ethylenically unsaturated compound. Also, examples of the polycondensation based resin include homopolymers or copolymers of a polyester.

The block copolymer of the addition polymerization based resin is described.

Examples of the ethylenically unsaturated compound include styrenes, (meth)acrylic acid esters, ethylenically unsaturated nitriles, ethylenically unsaturated carboxylic acids, vinyl ethers, vinyl ketones and olefins.

The ethylenically unsaturated compound for synthesizing the block of the first resin is preferably styrenes (styrene and/or derivatives thereof). Examples of the styrenes include styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene and 3,4-dichlorostyrene. Of these, styrene is preferably useful.

The block of the first resin is preferably a non-crystalline polymer, and more preferably non-crystalline polystyrene.

The ethylenically unsaturated compound for synthesizing the block of the second resin is preferably a (meth)acrylic acid ester, and more preferably an acrylic acid ester.

The photoreactive group can be introduced by adding a polyfunctional ethylenically unsaturated compound having two or more ethylenically unsaturated groups as the ethylenically unsaturated compound. As the polyfunctional ethylenically unsaturated compound, those which are known can be used. Though the polyfunctional ethylenically unsaturated compound is not limited, a mode in which the photoreactive group is introduced into the block of the first resin is preferable. One obtained by further introducing one or more photoreactive groups into the foregoing styrene which is suitably used for the first resin is preferable; one obtained by introducing from 1 to 3 photoreactive groups into the foregoing styrene is more preferable; and one obtained by introducing one photoreactive group into the foregoing styrene is further preferable. Specifically, divinylbenzene or the like is preferable. Also, besides the styrenes, divinyl adipate or the like is preferably useful.

In synthesizing the block of the first resin, the polyfunctional ethylenically unsaturated compound may be added as a copolymerization component, or after synthesizing the block of the first resin, the polyfunctional ethylenically unsaturated compound may be post-added, thereby introducing a photoreactive group into an end of the block.

It is preferable that the block copolymer of the ethylenically unsaturated compound is synthesized by means of living polymerization inclusive of anionic polymerization, cationic polymerization, radical polymerization and living coordination polymerization. Above all, it is more preferable to adopt living radical polymerization in view of easiness of combination of monomers thereof.

A number average molecular weight Mn of the block copolymer is preferably from about 10,000 to about 150,000, more preferably from about 20,000 to about 100,000, and further preferably from about 30,000 to about 60,000. When the number average molecular weight Mn of the block copolymer falls within the foregoing range, a sufficient pressure plasticity flow behavior is displayed as compared with the case where the number average molecular weight Mn of the block copolymer falls outside the foregoing range.

A number average molecular weight of each of the blocks is preferably from 5,000 to 75,000, more preferably from 10,000 to 50,000, and further preferably from 15,000 to 30,000. When the number average molecular weight of each of the blocks falls within the foregoing range, a balance among a mechanical strength against various stresses within a toner system, fixability under pressure and an image intensity after fixing is favorable as compared with the case where the number average molecular weight of each of the blocks falls outside the foregoing range.

The number average molecular weight is, for example, measured by means of gel permeation chromatography (using HLC-8120GPC with a TSK-GEL GMH column, manufactured by Tosoh Corporation) under the following condition.

The measurement is carried out by allowing a solvent (tetrahydrofuran) to flow at a flow rate of 1.2 mL per minute at a temperature of 40° C. and injecting 3 mg of a tetrahydrofuran sample solution in a concentration of 0.2 g/20 mL. In measuring the molecular weight of the sample, a measurement condition under which the molecular weight which the instant sample has is included within the range where a relationship between a logarithm of molecular weight of a calibration curve prepared from several kinds of monodispersed polystyrene standard samples and a count number is a straight line is chosen.

Next, the polyester based block copolymer is described. In the polyester based block copolymer, a non-crystalline polyester resin as the block of the first resin and a crystalline polyester resin as the block of the second resin are preferably useful.

The polyester based block copolymer is manufactured by a polymer reaction or a polycondensation reaction. For example, a method of binding a mixture of a crystalline polyester resin and a non-crystalline polyester resin by means of a polymer reaction; a method of mixing a previously manufactured crystalline polyester resin with a non-crystalline polyester resin forming monomer and polymerizing the mixture or an inverse method thereof; and so on are adopted.

It is meant by the term "crystalline" as shown in the foregoing "crystalline polyester resin" that the polyester resin has a distinct endothermic peak but not a stepwise endothermic change in the differential scanning calorimetry (DSC). Specifically, it is meant that a half value width of the endothermic peak in the measurement at a temperature rising rate of 10° C./min falls within 15° C.

On the contrary, it is meant that a resin whose half value width of the endothermic peak exceeds 15° C., or a resin in which a distinct endothermic peak is not seen is non-crystalline (amorphous).

Such a crystalline polyester resin or non-crystalline polyester resin capable of forming a block is, for example, manufactured by using an aliphatic, alicyclic or aromatic polyvalent carboxylic acid or an alkyl ester thereof and a polycondensable monomer such as polyhydric alcohols or ester compounds thereof and hydroxycarboxylic acids and polycondensing them in an aqueous medium by means of a direct esterification reaction, an ester exchange reaction, etc.

As the foregoing polyvalent carboxylic acid, polyhydric alcohol and hydroxycarboxylic acid and the like, those which are used for the polyester resin disclosed in JP-A-2007-114635 and JP-A-2007-322953 are also useful in the present exemplary embodiment.

Examples of the polyvalent carboxylic acid which is used for the purpose of obtaining the crystalline polyester resin include oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconic acid, n-dodecylsuccinic acid, n-dodecenylsuccinic acid, indodecylsuccinic acid, indodecenylsuccinic acid, n-octylsuccinic acid, n-octenylsuccinic acid and acid anhydrides or acid chlorides thereof.

Examples of the polyol which is used for the purpose of obtaining the crystalline polyester resin include ethylene glycol, diethylene glycol, triethylene glycol, 1,2-propylene glycol, 1,3-propylene glycol, 1,4-butanediol, 1,4-butenediol, 1,5-pentanediol, 1,6-hexanediol, 1,4-cyclohexanediol and 1,4-cyclohexanedimethanol.

Also, a crystalline polyester resin obtained by subjecting caprolactone or the like to ring-opening polymerization is preferably useful.

Examples of such a crystalline polyester resin include a polyester resin obtained by allowing 1,9-nonanediol and 1,10-decanedicarboxylic acid to react with each other; a polyester resin obtained by allowing cyclohexanediol and adipic acid to react with each other; a polyester resin obtained by allowing 1,6-hexanediol and sebacic acid to react with each other; a polyester resin obtained by allowing ethylene glycol and succinic acid to react with each other; a polyester resin obtained by allowing ethylene glycol and sebacic acid to react with each other; and a polyester resin obtained by allowing 1,4-butanediol and succinic acid to react with each other. Of these, a polyester resin obtained by allowing 1,9-nonanediol and 1,10-decanedicarboxylic acid to react with each other and a polyester resin obtained by allowing 1,6-hexanediol and sebacic acid to react with each other are especially preferable.

Also, examples of the polyvalent carboxylic acid which is used for the purpose of obtaining the non-crystalline polyester resin include dicarboxylic acids such as phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycollic acid, p-phenylenediglycollic acid, o-phenylenediglycollic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid. Also, examples of the polyvalent carboxylic acid other than the dicarboxylic acid include trimellitic acid, pyromellitic acid, naphthalenetricarboxylic acid, naphthalenetetracarboxylic acid, pyrenetricarboxylic acid and pyrenetetracarboxylic acid. Also, those obtained by inducing the carboxyl group of such a carboxylic acid into an acid anhydride, an acid chloride, an ester or the like may be used.

Of these, it is preferable to use terephthalic acid or a lower ester thereof, diphenylacetic acid, cyclohexanedicarboxylic acid or the like. The lower ester as referred to herein means an ester of an aliphatic alcohol having from 1 to 8 carbon atoms.

Also, as the polyol which is used for the purpose of obtaining the non-crystalline polyester resin, it is preferable to use polytetramethylene glycol, bisphenol A, bisphenol Z, hydrogenated bisphenol A, cyclohexanedimethanol or the like.

Also, examples of the non-crystalline resin include polycondensates of a hydroxycarboxylic acid.

Specific examples of the polycondensate of a hydroxycarboxylic acid include polycondensates of hydroxyheptanoic acid, hydroxyoctanoic acid, hydroxydecanoic acid, hydroxyundecanoic acid and lactic acid. Of these, it is preferable to use a polycondensate of lactic acid.

In order to prepare a single kind of a polycondensation resin, each of the polyvalent carboxylic acid and the polyol may be used singly; one side of them may be used singly, with the other side being used in combinations of two or more kinds thereof; or each of them may be used in combinations of two or more kinds thereof. Also, in the case where a hydroxycarboxylic acid is used for the purpose of preparing a single kind of a polycondensation resin, a single kind of the hydroxycarboxylic acid may be used singly or in combinations of two or more kinds thereof, or may be used in combination with a polyvalent carboxylic acid or a polyol.

In order to introduce a photoreactive group, a trivalent or polyvalent carboxylic acid, a trihydric or polyhydric alcohol and a hydroxycarboxylic acid having a hydroxyl group and a carboxyl group in a total number of three or more are useful.

Examples of the trivalent or polyvalent carboxylic acid include trimellitic acid, pyromellitic acid, naphthalenetricarboxylic acid, naphthalenetetracarboxylic acid, pyrenetricarboxylic acid and pyrenetetracarboxylic acid.

Also, examples of the trihydric or polyhydric alcohol include glycerin, pentaerythritol, hexamethylolmelamine, hexaethylolmelamine, tetramethylolbenzoguanamine and tetraethylolbenzoguanamine.

Examples of the hydroxycarboxylic acid include an aromatic hydroxycarboxylic acid and an aliphatic hydroxycarboxylic acid. Of these, it is preferable to use an aliphatic hydroxycarboxylic acid, and examples of the hydroxycarboxylic acid include tartaric acid, malic acid and citric acid.

In the polyester resin obtained by using such a polycondensable monomer, the hydroxyl group or the carboxyl group remains without being used for the polycondensation reaction, and the photoreactive group is introduced utilizing such a group. For example, in the case where the carboxyl group remains without being allowed to react by the use of trimellitic acid, a monomer having a photoreactive group such as a hydroxyalkyl(meth)acrylate and a catalyst are added to cause a condensation reaction, thereby introducing a (meth)acryloyloxy group into a side chain of the polyester resin.

In the case where a crystalline polyester resin as the second resin and a non-crystalline polyester resin as the first resin are mixed and subjected to a polymerization reaction to obtain a block copolymer, a crystal melting temperature of the crystalline polyester resin is preferably from 40° C. to 150° C., more preferably from 50° C. to 120° C., and especially preferably from 50° C. to 90° C.

The melting temperature of the crystalline polyester resin is measured according to the differential scanning calorimetry (DSC) by, for example, "DSC-20" (manufactured by Seiko Instruments Inc.). Specifically, the melting temperature is determined as a melting peak temperature in the measurement of input compensation differential scanning calorimetry shown in JIS K-7121:87 in performing the measurement of about 10 mg of a sample from room temperature to 150° C. at a constant temperature rising rate (10° C./min). There may be the case where the crystalline resin includes one showing plural melting peaks. In such case, a maximum peak thereof is regarded as the melting temperature in the present exemplary embodiment.

Also, in the present exemplary embodiment, a glass transition temperature of the block copolymer is preferably from 50° C. to 80° C., and more preferably from 50° C. to 65° C.

Also, a melting temperature of the block copolymer is preferably from 50° C. to 100° C., and more preferably from 50° C. to 80° C. When the melting temperature of the block copolymer falls within the foregoing range, cleaning properties are enhanced as compared with the case where the melting temperature of the block copolymer falls outside the foregoing range.

In the block copolymer, there may be the case where the melting temperature and the glass transition temperature are not distinctly observed.

In the case where the crystalline polyester resin and the non-crystalline polyester resin are mixed and subjected to a polymerization reaction to obtain a block copolymer, a weight average molecular weight Mw of the crystalline polyester resin to be mixed is preferably from 1,000 to 100,000, and more preferably from 1,500 to 10,000. Also, a weight average molecular weight Mw of the non-crystalline polyester resin to be mixed is preferably 1,000 to 100,000, and more preferably from 2,000 to 10,000.

A weight average molecular weight Mw of the polyester based block copolymer is preferably from 5,000 to 500,000, and more preferably from 5,000 to 50,000.

Also, the polyester based block copolymer may be partially branched or crosslinked by selection of a carboxylic acid valence or an alcohol valence of monomers, addition of a crosslinking agent or the like.

A value of the average molecular weight is measured by means of gel permeation chromatography (GPC).

Each of the crystalline polyester resin and the non-crystalline polyester resin is manufactured by subjecting a polyol and a polyvalent carboxylic acid to a polycondensation reaction in the usual way. It is possible to achieve this polycondensation reaction by a general polycondensation method such as polymerization in water, for example, bulk polymerization, emulsion polymerization, etc., solution polymerization and interfacial polymerization. Of these, bulk polymerization is preferably adoptive. Also, though the reaction can be performed under atmospheric pressure, in the case where it is aimed to realize a high molecular weight of the obtained polyester molecule, a general condition such as one under a reduced pressure and one in a nitrogen gas stream is useful.

Specifically, each of the crystalline polyester resin and the non-crystalline polyester resin is manufactured by charging the foregoing polyhydric alcohol and polyvalent carboxylic acid and optionally, a catalyst; feeding them in a reactor equipped with a thermometer, a stirrer and a down flow condenser; heating the mixture in the presence of an inert gas (for example, a nitrogen gas, etc.); continuously eliminating a low-molecular weight compound as a by-product outside the reaction system; and stopping the reaction at a point where it reaches prescribed molecular weight and acid value and so on, followed by cooling to obtain a desired reaction product.

II. Resin Composition:

The resin composition according to the present exemplary embodiment is characterized by including the baroplastic according to the present exemplary embodiment, a photopolymerization initiator and a polymerizable compound capable of reacting with a photoreactive group. The resin composition according to the present exemplary embodiment includes not only a resin composition including merely a baroplastic, a photopolymerization initiator and a polymerizable compound but one in a state where after molding the foregoing baroplastic, a mixture of a photopolymerization initiator and a polymerizable compound is fed into the baroplastic after molding. Also, the resin composition according to the present exemplary embodiment includes one in a state where a capsule having a photopolymerization initiator filled therein or a capsule having a polymerizable compound filled therein is dispersed in the baroplastic.

1. Polymerizable Compound:

The polymerizable compound is not limited so far as it is reactive with the photoreactive group introduced into the baroplastic. In the present exemplary embodiment, similar to the preferred range of the photoreactive group, an ethylenically unsaturated compound having at least one group having a radical polymerizable ethylenically unsaturated group is preferable.

The ethylenically unsaturated compound may be in any form of a monomer, an oligomer or a polymer. The ethylenically unsaturated compound is preferably in a form of a monomer or an oligomer, and more preferably in a form of a monomer. Also, a number average molecular weight of the ethylenically unsaturated compound is preferably less than 1,000. The ethylenically unsaturated compound may be used singly. Also, the ethylenically unsaturated compound may be used in combinations of two or more kinds thereof in an arbitrary ratio for the purpose of enhancing the desired characteristics.

Examples of the radical polymerizable ethylenically unsaturated compound include radical polymerizable compounds such as unsaturated carboxylic acids, for example, acrylic acid, methacrylic acid, itaconic acid, crotonic acid, isocrotonic acid, maleic acid, etc., and salts thereof; acid anhydrides having an ethylenically unsaturated group; acrylonitrile; styrene; and various unsaturated polyesters, unsaturated polyethers, unsaturated polyamides and unsaturated polyurethanes.

Specific examples of the ethylenically unsaturated compound include acrylic acid derivatives such as methyl acrylate, ethyl acrylate, n-butyl acrylate, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, propylene glycol diacrylate, dipropylene glycol diacrylate, tripropylene glycol diacrylate, tetrapropylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate, lauryl acrylate and hexanediol diacrylate; methacrylic acid derivatives such as methyl methacrylate, ethyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate and 2,2-bis(4-methacryloxypolyethoxyphenyl) propane; N-vinyl compounds such as N-vinylpyrrolidone and N-vinylcaprolactam; and derivatives of an allyl compound such as allyl glycidyl ether, diallyl phthalate and triallyl trimellitate. More specifically, radical polymerizable or crosslinkable monomers, oligomers and polymers which are commercially available or known in the industry are useful.

Also, as the radical polymerizable compound, polymerizable compound materials of a photocuring type which are used for a photopolymerizable composition are known, and these materials are applicable in the present exemplary embodiment.

Examples of other polymerizable compounds which can be used in the present exemplary embodiment include (meth) acrylic acid esters such as (meth)acrylic monomers or prepolymers, epoxy based monomers or prepolymers and urethane based monomers or prepolymers. Compounds having an alicyclic hydrocarbon group are also preferably useful.

That is, examples of such an acrylate compound include acrylate compounds such as 2-ethylhexyl diglycol acrylate, 2-hydroxy-3-phenoxypropyl acrylate, 2-hydroxybutyl acrylate, hydroxypivalic acid neopentyl glycol diacrylate, 2-acryloyloxyethyl phthalate, methoxypolyethylene glycol acrylate, tetramethylolmethane triacrylate, 2-acryloyloxyethyl-2-hydroxyethyl phthalate, dimethyloltricyclodecane diacrylate, ethoxylated phenyl acrylate, 2-acryloyloxyethyl succinate, nonylphenol ethylene oxide (EO) adduct acrylate, modified glycerin triacrylate, bisphenol A diglycidyl ether acrylic acid adduct, modified bisphenol A diacrylate, phenoxypolyethylene glycol acrylate, 2-acryloyloxyethyl hexahydrophthalate, propylene oxide (PO) adduct diacrylate of bisphenol A, BO adduct diacrylate of bisphenol A, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate, hexamethylene diisocyanate urethane polymer, stearyl acrylate, isoamyl acrylate, isomyristyl acrylate, isostearyl acrylate and lactone-modified acrylate; and methacrylate compounds obtained by changing the acryloyloxy group of such an acrylate compound to a methacryloxy group.

Also, in the case where the photoreactive group is a cationic polymerizable group, among oxirane ring-containing compounds including an oxirane ring (for example, an oxiranyl group or an epoxy group), oxetane ring-containing compounds including an oxetane ring (for example, an oxetanyl group), compounds having a vinyl ether group and so on, known compounds which are used as a cationic polymerizable monomer are useful.

A use amount of the polymerizable compound is preferably from 0.1% by weight to 30% by weight on the basis of the amount of the baroplastic resin. When the use amount of the polymerizable compound falls within the foregoing numerical value range, the pressure plasticity efficiently disappears as compared with the case where polymerizable compound falls outside the foregoing numerical value range.

2. Photopolymerization Initiator:

As the photopolymerization initiator, known photopolymerization initiators can be used. In the present exemplary embodiment, it is preferable to use a photopolymerization initiator capable of generating a radical.

The photopolymerization initiator is a compound which absorbs external energy due to active radiations to generate a polymerization initiation species.

The "active radiations" as referred to in the present exemplary embodiment are not particularly limited so far as they are active radiations having energy capable of generating an initiation species of a curing reaction upon being irradiated in a resin composition or in the vicinity thereof and widely include α-rays, γ-rays, X-rays, ultraviolet rays (UV), visible light beams and electron beams. Of these, from the viewpoints of curing sensitivity and easiness of availability of an apparatus, ultraviolet rays and electron beams are preferable, and ultraviolet rays are especially preferable. Accordingly, in the present exemplary embodiment, a resin composition which is curable upon being irradiated with ultraviolet rays as the radiations is preferable.

The wavelength to be used is not particularly limited. A wavelength region of from 200 nm to 500 nm is preferable, and a wavelength region of from 200 nm to 450 nm is more preferable.

Examples of the radical photopolymerization initiator include (a) an aromatic ketone, (b) an acyl phosphine compound, (c) an aromatic onium salt compound, (d) an organic peroxide, (e) a thio compound, (f) a hexaaryl biimidazole compound, (g) a keto oxime ester compound, (h) a borate compound, (i) an azinium compound, (j) a metallocene compound, (k) an active ester compound, (l) a compound having a carbon-halogen bond and (m) an alkylamine compound.

Of the foregoing, an arbitrary compound may be used. Also, in the present exemplary embodiment, the photopolymerization initiator may be used singly or in combinations of two or more kinds thereof.

In the case where the photoreactive group is a cationic polymerizable group, a photo-acid generator is used as the photopolymerization initiator. Examples of the photo-acid generator include $B(C_6H_5)_4^-$, $PF_6^-$, $AsF_6^-$, $SbF_6^-$ and $CF_3SO_3^-$ salts, sulfonated compounds capable of generating sulfonic acid and halides capable of photo-generating a hydrogen halide of an aromatic onium compound (for example, diazonium, ammonium, iodonium, sulfonium, phosphonium, etc.); and iron-arene complexes.

A content or feed amount of the photopolymerization initiator is preferably from 0.01% by weight to 35% by weight, more preferably from 0.1% by weight to 30% by weight, and further preferably from 0.5% by weight to 30% by weight relative to the total amount of the foregoing baroplastic resin.

Also, in the case where a sensitizer as described later is used, the photopolymerization initiator is used relative to the sensitizer in amount of preferably from 200/1 to 1/200, more preferably from 50/1 to 1/50, and further preferably from 20/1 to 1/5 in terms of a weight ratio of the photopolymerization initiator to the sensitizer.

In the present exemplary embodiment, in order to accelerate decomposition of the photopolymerization initiator upon being irradiated with active radiations, a sensitizer is optionally used in combinations.

The sensitizer absorbs specified active radiations to become in an electron-excited state. The sensitizer having become in an electron-excited state comes into contact with the polymerization initiator to cause an action such as electron transfer, energy transfer and heat generation, thereby accelerating a chemical change of the photopolymerization initiator, namely decomposition and generation of a radical, an acid or a base.

3. Physical Properties of Resin Composition:

In the resin composition according to the present exemplary embodiment, it is preferable that the baroplastic before irradiation with light satisfies the relationship of the following expression (2) and that the resin composition after irradiation with light satisfies the relationship of the following expression (3).

$$20° C. \leq \{T(1\ \text{MPa}) - T(30\ \text{MPa})\}° C. \tag{2}$$

$$\{T(1\ \text{MPa}) - T(30\ \text{MPa})\}° C. < 20° C. \tag{3}$$

In the expressions (2) and (3), T(1 MPa) represents a temperature at which a viscosity reaches $10^4$ Pa·s under an impressed pressure of flow tester of 1 MPa; and T(30 MPa) represents a temperature at which a viscosity reaches $10^4$ Pa·s under an impressed pressure of flow tester of 30 MPa.

The expression (2) is the same as the foregoing expression (1), and a preferred range thereof is also the same.

When the resin composition satisfies the relationship of the foregoing expression (3), it is free from a plasticization behavior due to pressurization and excellent in a physical strength after curing.

A value of $\{T(1\ \text{MPa}) - T(30\ \text{MPa})\}$ in the expression (3) is preferably from 0° C. to 5° C.

In the present exemplary embodiment, it is preferable that the baroplastic before irradiation with light satisfies the relationship of the following expression (4) and that the resin composition after irradiation with light satisfies the relationship of the following expression (5).

$$T(30\ \text{MPa})° C. \leq 100° C. \tag{4}$$

$$100° C. < T(30\ \text{MPa})° C. \tag{5}$$

In the expressions (4) and (5), T(30 MPa) represents a temperature at which a viscosity reaches $10^4$ Pa·s under an impressed pressure of flow tester of 30 MPa.

A value of T(30 MPa)° C. of the baroplastic before irradiation with light in the expression (4) is more preferably not higher than 80° C., and further preferably not higher than 60° C. When the value of T(30 MPa)° C. of the baroplastic before irradiation with light falls within the foregoing numerical value range, fixing can be achieved under a low pressure as compared with the case where the value of T(30 MPa)° C. of the baroplastic before irradiation with light falls outside the foregoing numerical value range.

A value of T(30 MPa)° C. of the resin composition after irradiation with light in the expression (5) is more preferably 120° C. or higher, and further preferably 130° C. or higher. When the value of T(30 MPa)° C. of the resin composition after irradiation with light falls within the foregoing numerical value range, a sufficient image intensity after fixing is displayed as compared with the case where the relationship of the expression (5) is not satisfied.

Also, in the resin composition according to the present exemplary embodiment, it is preferable that the baroplastic contains the first resin having a photoreactive group and the second resin; that the first resin and the second resin before irradiation with light satisfy a relationship of the following expression (6); and that the first resin and the second resin after irradiation with light satisfy a relationship of the following expression (7):

$$0.5 \leq \{(\text{Mn of the first resin})/(\text{Mn of the second resin})\} < 1.5 \tag{6}$$

$$1.5 \leq \{(\text{Mn of the first resin})/(\text{Mn of the second resin})\} \tag{7}$$

In the case where the expression (6) is satisfied, sufficient pressure plasticity is displayed as compared with the case where the expression (6) is not satisfied.

In the case where the expression (7) is satisfied, the resin composition after curing to be caused due to irradiation with light is suppressed in a plasticization behavior due to pressurization and is excellent in a physical strength (image intensity) as compared with the case where the expression (7) is not satisfied.

III. Electrostatic-Image-Developing Toner:

The electrostatic-image-developing toner according to the present exemplary embodiment is characterized by including the baroplastic according to the present exemplary embodiment.

In the present exemplary embodiment, a content of the baroplastic is preferably from about 50% by weight to about 99% by weight, and more preferably from about 70% by weight to about 95% by weight based on 100% by weight of the electrostatic-image-developing toner. What the content of the baroplastic falls within the foregoing numerical value range is preferable because fixability is excellent in fixing under pressure or heat and pressure.

1. Coloring Agent:

The electrostatic-image-developing toner according to the present exemplary embodiment preferably includes a coloring agent.

As the coloring agent, those which are known can be used. The coloring agent may be arbitrarily chosen from the viewpoints of hue angle, saturation, brightness, weather resistance, OHP transmittance and dispersibility in the toner.

Specific examples of the coloring agent which can be used in the present exemplary embodiment include various pigments such as carbon black, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, Du Pont Oil Red, Pyrazolone Red, Lithol Red, Rhodamine B Lake, Lake Red C, Rose Bengale, Aniline Blue, Ultramarine Blue, Chalco Oil Blue, Methylene Blue Chloride, Phthalocyanine Blue, Phthalocyanine Green, Malachite Green Oxalate and Titanium Black; and various dyes such as acridine based dyes, xanthene based dyes, azo based dyes, benzoquinone based dyes, azine based dyes, anthraquinone based dyes, thioindigo based dyes, dioxazine based dyes, thiazine based dyes, azomethine based dyes, indigo based dyes, thioindigo based dyes, phthalocyanine based dyes, aniline black based dyes, polymethine based dyes, triphenylmethane based dyes, diphenylmethane based dyes, thiazine based dyes, thiazole based dyes and xanthene based dyes.

Also, specifically, for example, carbon black, a nigrosine dye (C.I. No. 50415B), Aniline Blue (C.I. No. 50405), Chalco Oil Blue (C.I. No. azoic Blue 3), Chrome Yellow (C.I. No. 14090), Ultramarine Blue (C.I. No. 77103), Du Pont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 42000), Lamp Black (C.I. No. 77266), Rose Bengale (C.I. No. 45435) and mixtures thereof are preferably useful as the coloring agent.

A use amount of the coloring agent is preferably from 0.1% by weight to 20% by weight, and more preferably from 0.5% by weight to 10% by weight based on 100% by weight of the toner. Also, as the coloring agent, such a pigment or dye or the like can be used singly or in combinations of two or more kinds thereof.

Also, in the case where a magnetic material as described later is used as a black coloring agent, different from other coloring agents, it is added in an amount of from 12% by weight to 240% by weight.

2. Release Agent:

The electrostatic-image-developing toner according to the present exemplary embodiment preferably includes a release agent.

Specific examples of the release agent which can be used in the present exemplary embodiment include various ester waxes; low-molecular weight polyolefins such as polyethylene, polypropylene and polybutene; silicones which reveal a softening temperature by heating; fatty acid amides such as oleic amide, erucic amide, ricinoleic amide and stearic amide; vegetable waxes such as carnauba wax, rice wax, candelilla wax, Japan wax and jojoba oil; animal waxes such as beeswax; mineral or petroleum based waxes such as montan wax, ozokerite, ceresin, paraffin wax, microcrystalline wax, microcrystalline wax and Fischer-Tropsch wax; and modified products thereof.

In the electrostatic-image-developing toner according to the present exemplary embodiment, a content of the release agent is preferably in the range of from 1% by weight to 20% by weight, and more preferably in the range of from 3% by weight to 15% by weight based on 100% by weight of the binder resin. When the content of the release agent falls within the foregoing numerical value range, both favorable fixability and image quality characteristic can be made compatible with each other, as compared with the case where the content falls outside the foregoing numerical value range.

3. Internal Additive and Other Additives:

If desired, for the electrostatic-image-developing toner according to the present exemplary embodiment, known various internal additives which are used for such a kind of toner, such as a charge controlling agent, an antioxidant and an ultraviolet absorbing material are used.

As the charge controlling agent, those which are known, inclusive of positively chargeable charge controlling agents such as nigrosine based dyes, quaternary ammonium salt based compounds, triphenylmethane based compounds, imidazole based compounds and polyamine based resins; and negatively chargeable charge controlling agent such as metal-containing azo based dyes of chromium, cobalt, aluminum, iron, etc., metal salts or metal complexes of chromium, zinc, aluminum, etc. with a hydroxycarboxylic acid (for example, salicyclic acid, an alkyl salicylic acid, benzilic acid, etc.), amide compounds, phenol compounds, naphthol compounds and phenol amide compounds, are useful.

Also, if desired, the electrostatic-image-developing toner according to the present exemplary embodiment may include a flame retarder or a flame retarding assistant. Examples of the flame retarder or flame retarding assistant include bromine based flame retarders which are already used for various purposes, antimony trioxide, magnesium hydroxide, aluminum hydroxide and ammonium polyphosphate. However, it should not be construed that the invention is limited thereto.

Also, in the case where the electrostatic-image-developing toner according to the present exemplary embodiment is used as a magnetic toner, a magnetic powder may be included. Specifically, though a material capable of being magnetized in the magnetic field is used, a ferromagnetic powder of iron, cobalt, nickel, etc., or a compound such as ferrite and magnetite is useful.

In the present exemplary embodiment, when the toner is obtained in an aqueous phase, it is necessary to pay attention to aqueous phase transferability of the magnetic material. It is preferable that the magnetic material is previously subjected to surface modification, for example, a hydrophobilization treatment, etc.

Also, for the purposes of imparting fluidity and enhancing cleaning properties, the electrostatic-image-developing toner according to the present exemplary embodiment is used by drying the toner likewise a usual toner and then adding an inorganic particle of, for example, silica, alumina, titania, calcium carbonate, etc. or a resin particle of, for example, a vinyl based resin, a polyester, a silicone, etc. onto the surface of the toner particle while applying a shear in a dry state.

Also, in the case where the particle is made to adhere to the toner surface in an aqueous medium, so far as the inorganic particle is concerned, all of materials which are in general used as an external additive on the toner surface, such as silica, alumina, titania, calcium carbonate, magnesium carbonate and tricalcium phosphate, are used upon being dispersed with an ionic surfactant, a polymer acid or a polymer base.

4. Volume Average Particle Size, Particle Size Distribution and Shape Factor:

A volume average particle size ($D_{50v}$) of the electrostatic-image-developing toner according to the present exemplary embodiment is preferably from 2 μm to 10 μm, more preferably from 3 μm to 8 μm, and further preferably from 5 μm to 7 μm. When the volume average particle size ($D_{50v}$) of the electrostatic-image-developing toner falls within the foregoing range, the image quality characteristic after fixing is favorable, as compared with the case where the volume average particle size ($D_{50v}$) falls outside the foregoing range.

Also, the particle size distribution of the toner is preferably narrow. $GSD_p$ is preferably not more than 1.40, more preferably not more than 1.31, and especially preferably not more than 1.27. Also, $GSD_p$ is preferably 1.15 or more.

When both the volume average particle size and the $GSD_p$ fall within the foregoing ranges, since an extremely small particle is not present, a lowering of developability to be caused due to an excess of the charge amount of a small-particle size toner is suppressed.

In the case where the particle size of the particle is not more than about 5 μm, the measurement is performed using a laser diffraction scattering particle size distribution analyzer (LA-700, manufactured by Horiba, Ltd.).

Also, a volume average primary particle size, a number average particle size distribution index and a volume average particle size distribution index of the prepared aggregated particle and so on are measured by an analyzer, for example, Coulter Multimizer Type II (manufactured by Beckman Coulter K.K.), etc. The cumulative distributions of volume and number of particles are drawn from the smaller particle side to the particle size range (channel) divided on the basis of the particle size distribution, and the particle size of accumulation of 16% is defined as volume $D_{16v}$ and number $D_{16p}$; the particle size of accumulation of 50% is defined as volume $D_{50v}$ and number $D_{50p}$; and the particle size of accumulation of 84% is defined as volume $D_{84v}$ and number $D_{84p}$, respectively. By using these values, a volume average particle size distribution index ($GSD_v$) is computed as $(D_{84v}/D_{16v})^{1/2}$, and a number average particle size distribution index ($GSD_p$) is computed as $(D_{84p}/D_{16p})^{1/2}$.

A shape factor SF1 of the electrostatic-image-developing toner is preferably in the range of from 110 to 145, and more preferably in the range of from 120 to 140. The shape factor SF1 is a shape factor expressing a degree of unevenness of the particle surface and is computed according to the following expression.

$$SF1=\{(ML)^2/A\}\times(\pi/4)\times100$$

In the foregoing expression, ML represents a maximum length of the particle; and A represents a projected area of the particle.

As a specific method for measuring SF1, there is exemplified a method in which an optical microscopic image of the toner sprayed on a slide glass is first taken into an image analyzer via a video camera, SF1 is computed as to 50 toner particles, and an average value is then determined therefrom.

A method for manufacturing the electrostatic-image-developing toner according to the present exemplary embodiment (hereinafter also simply referred to as "toner manufacturing method") is not particularly limited, and chemical manufacturing methods such as existing kneading pulverization method, suspension polymerization method and emulsification aggregation method can be utilized. However, it is preferable that the toner manufacturing method includes at least a step of preparing an aqueous dispersion of a resin particle including a block copolymer having a block having an ethylenically unsaturated compound polymerized therein (this step will be also hereinafter referred to as "block copolymer resin particle dispersion-preparing step").

In the case where the toner manufacturing method according to the present exemplary embodiment includes a block copolymer resin particle dispersion-preparing step, an emulsification aggregation method or a suspension method is preferable as the toner manufacturing method according to the present exemplary embodiment.

IV. Electrostatic Image Developer:

The electrostatic-image-developing toner according to the present exemplary embodiment is used as an electrostatic image developer (hereinafter also referred to as "developer"). This developer is not particularly limited, except for the fact that it includes this electrostatic-image-developing toner and takes a proper component composition depending upon the purpose. When the electrostatic-image-developing toner is used singly, the developer is prepared as an electrostatic image developer of a single-component system; and when the electrostatic-image-developing toner is used in combination with a carrier, the developer is prepared as an electrostatic image developer of a two-component system.

There is also applicable a method in which the developer of a single-component system is frictionally charged with a development sleeve or a charging member to form a charged toner, which is then developed according to a latent image.

The carrier is not particularly limited. In general, examples thereof include a magnetic material particle (for example, an iron powder, ferrite, an iron oxide powder, nickel, etc.); a resin-coated carrier obtained by using a magnetic material particle as a core and coating the surface thereof with a resin (for example, styrene based resins, vinyl based resins, ethylene based resins, rosin based resins, polyester based resins, melamine based resins, etc.) or a wax (for example, stearic acid, etc.) to form a resin-coated layer; and a magnetic material-dispersed carrier obtained by dispersing a magnetic material particle in a binder resin. Of these, the resin-coated carrier is especially preferable because it is possible to control chargeability of the toner or resistance of the whole of the carrier due to the configuration of the resin-coated layer.

In the electrostatic image developer of a two-component system, a mixing proportion of the electrostatic-image-developing toner according to the present exemplary embodiment to the carrier is preferably from 2 parts by weight to 10 parts by weight based on 100 parts by weight of the carrier. Also, a method for preparing the developer is not particularly limited, and examples thereof include a method of mixing using a V-blender, etc.

V. Process Cartridge and Toner Cartridge:

The process cartridge according to the present exemplary embodiment accommodates the foregoing electrostatic-image-developing toner or the foregoing electrostatic image developer therein. The process cartridge according to the present exemplary embodiment is preferably one which is detachable relative to the image forming apparatus. The process cartridge according to the present exemplary embodiment is preferably one provided with an image holding member rotating in one direction and a development unit for feeding a toner to an electrostatic latent image formed on the surface of the image holding member to form a toner image; and more preferably one provided with at least one feed unit for feeding photocurable components including a photopolymerization initiator, a polymerizable compound and so on.

In the case where the electrostatic-image-developing toner includes all of the photocurable components therein, a process cartridge not provided with a feed unit for feeding photocurable components can be used in the present exemplary embodiment. Also, in addition to the foregoing, the foregoing process cartridge may include other members such as a destaticization unit as the need arises. As the process cartridge, known configurations may be adopted.

The toner cartridge according to the present exemplary embodiment accommodates the foregoing electrostatic-image-developing toner therein. The toner cartridge according to the present exemplary embodiment may accommodate the electrostatic-image-developing toner as an electrostatic image developer therein. The toner cartridge according to the present exemplary embodiment is preferably one which is detachable relative to the image forming apparatus. Also, the toner cartridge may be one in which a cartridge accommodating a toner singly therein and a cartridge accommodating a carrier singly therein are separately provided.

VI. Image Forming Method and Image Forming Apparatus:

The image forming method according to the present exemplary embodiment includes a charge step of charging an image holding member; a latent image forming step of forming an electrostatic latent image on the surface of the image holding member; a development step of developing the electrostatic latent image with a developer including a toner to form a toner image; a transfer step of transferring the toner image onto the surface of a transfer-receiving material to obtain a transferred toner image; a temporary fixing step of temporarily fixing the transferred toner image by a pressure to form a temporarily fixed image; a feed step of feeding a photopolymerization initiator and a polymerizable compound to the temporarily fixed image to bring them into contact with each other; and an irradiation step of irradiating the temporarily fixed image with UV, wherein the toner is the electrostatic-image-developing toner according to the present exemplary embodiment, or the developer is the electrostatic image developer according to the present exemplary embodiment; and the irradiation step is a step of polymerizing the baroplastic and the photopolymerizable compound upon being irradiated with UV, thereby really fixing the temporarily fixed image.

The image forming apparatus according to the present exemplary embodiment includes an image holding member; a charge unit of charging the image holding member; a latent image forming unit of exposing the image holding member to form an electrostatic latent image on the surface of the image holding member; a development unit of developing the electrostatic latent image with a developer including a toner to form a toner image; a transfer unit of transferring the toner image onto the surface of a transfer-receiving material from the image holding member; a temporary fixing unit of temporarily fixing the toner image by a pressure to form a temporarily fixed image; a feed unit of feeding a photopolymerization initiator and a photopolymerizable compound to the temporarily fixed image; and an irradiation unit of irradiating the temporarily fixed image with UV, wherein the toner is the electrostatic-image-developing toner according to the present exemplary embodiment, or the developer is the electrostatic image developer according to the present exemplary embodiment; and the irradiation unit is a unit of polymerizing the baroplastic and the photopolymerizable compound upon being irradiated with UV, thereby really fixing the temporarily fixed image.

Also, the irradiation unit is preferably a UV-LED ultraviolet light source.

The outlines of the image forming method and the image forming apparatus according to the present exemplary embodiment are hereunder described with reference to FIG. 1.

After a charge step of charging an image holding member 4 uniformly and homogeneously without causing unevenness by a charge unit 5, a latent image forming step is carried out by emitting exposure light from a semiconductor laser light source 1 on the basis of information read by an original reader, distributing the emitted light to the vertical direction against the paper surface by a polygon mirror 2 and irradiating the distributed light on the image holding member 4 via an fθ lens 3 capable of correcting a strain of an image.

After a development step of developing an electrostatic latent image on the image holding member 4 by a development unit 6, a formed toner image is transferred onto an image support (transfer-receiving material) 8 having been conveyed while fixing the timing by the action of a transfer unit 7. Furthermore, though the image holding member 4 and the transfer-receiving material 8 are separated from each other by a separation unit (separation electrode) 9, the toner image is transferred to and held by the image support (transfer-receiving material) 8 and then introduced into a fixing unit 10, thereby carrying out a temporary fixing step.

In the temporary fixing step, the toner image is temporarily fixed onto the transfer-receiving material 8 by a temporary fixing step of performing pressure fixing by a pair of pressure rollers 10a without heating. Furthermore, a feed step of feeding photocurable components (a polymerizable compound and a photopolymerization initiator) to the toner image in a sprayed form or by a coating roller or the like from a unit 10 of feeding the photocurable components; and an irradiation step of irradiating the toner image with ultraviolet rays from an irradiation unit 10c are carried out, thereby obtaining a fixed image.

A cleaning step of cleaning up an untransferred toner which remains on the surface image holding member 4, or the like may be carried out by a cleaning unit 11 of a cleaning blade mode, or a step of removing a residual charge by exposure before charge may be added. Furthermore, for the subsequent image formation, a charge step of performing homogeneous charge is again repeated by the charge unit 5.

In the image forming method according to the present exemplary embodiment, all of the foregoing charge step, latent image fainting step, development step and transfer step are a general step in itself and are disclosed in, for example, JP-A-56-40868, JP-A-49-91231, etc.

The foregoing various steps of the image forming method are carried out using an image forming apparatus which is known in itself, for example, copiers, facsimile machines, etc.

The various steps of the image forming method are hereunder described in detail.

As the charge step of charging the image holding member, a conventionally known step can be adopted.

Also, the foregoing latent image forming step is a step of forming an electrostatic latent image on the surface of the image holding member.

The foregoing development step is a step of developing the electrostatic latent image by a developer layer on a developer carrier to form a toner image. As the developer layer, the electrostatic-image-developing toner according to the present exemplary embodiment or the electrostatic image developer including this toner and a carrier according to the present exemplary embodiment is useful.

The foregoing transfer step is a step of transferring the toner image onto the surface of a transfer-receiving material to obtain a transferred toner image.

The foregoing temporary fixing step is a step of pressure fixing the toner image having been transferred onto a medium to be recorded such as recording paper by a pressure fixing device or the like, thereby forming a reproduced image. This temporary fixing step is preferably a step of performing pressure fixing by fixing the toner image under pressure without heating. A temporary fixing temperature for performing temporary fixing is preferably not higher than a temperature in machine of the image forming apparatus, more preferably not higher than 80° C., and further preferably from 10° C. to 60° C. What the fixing temperature falls within the foregoing range is preferable because favorable fixability is obtainable.

A fixing pressure in the temporary fixing step is preferably from 1 MPa to 30 MPa.

In that case, a pressure-imparting device constituted of upper and lower rollers is one in which a pressure is applied to a pair of metal-made rollers by a spring, etc. As the pressure to be applied, a pressure under which pressure plasticity can be revealed may be impressed.

What the fixing pressure falls within the foregoing numerical value range is preferable because sufficient fixability is obtainable. The fixing pressure as referred to herein means a maximum fixing pressure. The maximum fixing pressure as referred to herein represents a maximum value in a pressure change of a fixing nip from the inlet to the outlet in the paper traveling direction. Pressure distribution between a fixing roller and a pressure roller or the like is measured by a commercially available pressure distribution measuring sensor. For example, it is measured by a roller-roller pressure measuring system, manufactured by Kamata Industry Co., Ltd. or the like.

As the fixing roller which is suitably used as the temporary fixing unit, a conventionally known fixing roller is properly chosen and used within the range where the foregoing fixing pressure can be impressedd.

Examples thereof include fixing rollers in which a fluorocarbon resin (for example, TEFLON (a registered trademark)), a silicon based resin, a copolymer of tetrafluoroethylene ($C_2F_4$) and a perfluoroalkoxyethylene (PFA), etc. is coated on a cylindrical mandrel. Also, in order to obtain a high fixing pressure, a stainless steel (SUS)-made fixing roller may be used. In general, the fixing step is carried out by allowing the transfer-receiving material to pass between the two rollers. The two rollers may be formed of the same material or a different material from each other. Examples thereof include combinations such as SUS/SUS, SUS/silicon resin, SUS/PFA and PFA/PFA.

The irradiation step of irradiating the foregoing temporarily fixed image with UV and the irradiation unit are hereunder described.

Examples of a light source for irradiating ultraviolet rays include a xenon lamp, an ultraviolet curing type lamp (for example, a metal halide lamp) and a UV-LED ultraviolet light source. However, in light sources other than the UV-LED ultraviolet light source, ozone is emitted, and therefore, an exhauster is essential. For that reason, in the case where downsizing of device or environmental friendliness is taken into consideration, the UV-LED ultraviolet light source is preferable.

The foregoing cleaning step is a step of removing the electrostatic image developer remaining on the image holding member. In the image forming method according to the present exemplary embodiment, an embodiment further including a recycle step is preferable.

The recycle step is a step of transferring the electrostatic-image-developing toner recovered in the cleaning step to the developer layer. The image forming method of an embodiment including this recycle step may be carried out using an image forming apparatus such as a copier or a facsimile machine of a toner recycle system type. A cleaning blade 13 is composed of a rubbery elastic material having a thickness of from about 1 mm to 30 mm, and a urethane rubber is most frequently used. Also, a recycle system of an embodiment in which the cleaning step is omitted, and the toner is recovered simultaneously with the development may be applied. A desired reproduced article (for example, a printed matter, etc.) is obtained through a series of these treatment steps.

An untransferred toner which remains on the surface image holding member, or the like is cleaned up by the cleaning unit 11 of a cleaning blade system, a residual charge is removed by exposure before charge (not illustrated), and homogeneous charge is carried out by the charge unit 5 for the subsequent image formation.

The foregoing image support may also be called a recording material, recording paper, a transfer material or the like, and plain paper is representative for such a material. The image support is not particularly limited so far as an unfixed image after the development can be transferred, and as a matter of course, a PET base for OHP or the like is included.

Also, the image forming apparatus can be made an embodiment mounted with a process cartridge including the image holding member 4 and at least one of the charge unit 5, the development unit 6, the cleaning unit 11 and the transfer unit 7.

EXAMPLES

The present exemplary embodiment is hereunder described in more detail with reference to the following Examples, but it should be construed that the present exemplary embodiment is not limited thereto at all. The terms "parts" and "%" mean "parts by weight" and "% by weight", respectively, unless otherwise indicated.

Example 1

A radical polymerization initiator (TEMPO: 0.2 parts and VAZO88: 0.1 parts) is added to 60 parts of butyl acrylate, thereby achieving a polymerization reaction at 120° C.; thereafter, 43 parts of a styrene monomer is added, thereby further achieving a polymerization reaction; and thereafter, 5 parts of 1,4-divinylbenzene is added, thereby synthesizing a vinyl based block copolymer of styrene-butyl acrylate including a reactive site in a polystyrene segment. A {(Mn of the styrene segment)/(Mn of the butyl acrylate segment)} of this copolymer as computed by GPC analysis is found to be 0.9.

The thus obtained resin is coarsely pulverized and finely pulverized, and then classified to obtain a classified material having $D_{50}$ of 6.5 μm.

Example 2

Resin A 35 parts of terephthalic acid and 73 parts of BPA-2EO (an adduct of bisphenol A with 2 moles of ethylene oxide) are subjected to dehydration condensation at 200° C. using 0.2 parts of tin oxide as a catalyst, to which are subsequently added 1 part of trimellitic acid and 1 part of hydroxyethyl acrylate, and the mixture is subjected to hydration condensation at 120° C. to synthesize Resin A.

Resin B 26 parts of succinic acid and 15 parts of 1,3-propanediol are subjected to hydration condensation at 120° C. in the presence of an acid catalyst (dodecylbenzenesulfonic acid, manufactured by Wako Pure Chemicals Industries, Ltd.) to synthesize Resin B.

12 parts of Resin A and 28 parts of Resin B are subjected to block copolymerization by means of dehydration condensation in the presence of 0.4 parts of an acid catalyst (dodecylbenzenesulfonic acid) to synthesize a desired polyester based block copolymer having a photoreactive group. A {(Mn of the terephthalic acid-BPA-2EO-containing segment)/(Mn of the succinic acid-1,3-propanediol-containing segment)} of this copolymer as computed by GPC analysis is found to be 0.8. The thus obtained resin is coarsely pulverized and finely pulverized, and then classified to obtain a classified material having $D_{50}$ of 6.5 μm.

Example 3

A radical polymerization initiator (TEMPO: 0.2 parts and VAZO88: 0.1 parts) is added to 75 parts of stearyl acrylate, thereby achieving a polymerization reaction at 120° C.; thereafter, 35 parts of a styrene monomer is added, thereby further achieving a polymerization reaction; and thereafter, 5 parts of 1,4-divinylbenzene is added, thereby synthesizing a vinyl based block copolymer of styrene-stearyl acrylate including a reactive site in a polystyrene segment. A {(Mn of the styrene segment)/(Mn of the stearyl acrylate segment)} of this copolymer as computed by GPC analysis is found to be 0.5.

The thus obtained resin is coarsely pulverized and finely pulverized, and then classified to obtain a classified material having $D_{50}$ of 6.5 μm.

Example 4

A radical polymerization initiator (TEMPO: 0.2 parts and VAZO88: 0.1 parts) is added to 45 parts of stearyl acrylate, thereby achieving a polymerization reaction at 120° C.; thereafter, 60 parts of a styrene monomer is added, thereby further achieving a polymerization reaction; and thereafter, 5 parts of 1,4-divinylbenzene is added, thereby synthesizing a vinyl based block copolymer of styrene-stearyl acrylate including a reactive site in a polystyrene segment. A {(Mn of the styrene segment)/(Mn of the stearyl acrylate segment)} of this copolymer as computed by GPC analysis is found to be 1.5.

The thus obtained resin is coarsely pulverized and finely pulverized, and then classified to obtain a classified material having $D_{50}$ of 6.5 μm.

Comparative Example 1

A radical polymerization initiator (TEMPO: 0.2 parts and VAZO88: 0.1 parts) is added to 60 parts of butyl acrylate, thereby achieving a polymerization reaction at 120° C.; and thereafter, 60 parts of a styrene monomer is added to synthesize a vinyl based block copolymer of styrene-butyl acrylate. A {(Mn of the styrene segment)/(Mn of the butyl acrylate segment)} of this copolymer as computed by GPC analysis is found to be 6.5.

The thus obtained resin is coarsely pulverized and finely pulverized, and then classified to obtain a classified material having $D_{50}$ of 6.5 μm.

Comparative Example 2

Resin C 35 parts of terephthalic acid and 73 parts of BPA-2EO (an adduct of bisphenol A with 2 moles of ethylene oxide) are subjected to dehydration condensation at 200° C. using 0.2 parts of tin oxide as a catalyst to synthesize Resin C.

12 parts of Resin C and 28 parts of Resin B are subjected to block copolymerization in the presence of an acid catalyst (dodecylbenzenesulfonic acid) to synthesize a polyester based block copolymer. A {(Mn of the terephthalic acid-containing segment)/(Mn of the succinic acid-containing segment)} of this copolymer as computed by GPC analysis is found to be 2.7.

The thus obtained resin is coarsely pulverized and finely pulverized, and then classified to obtain a classified material having $D_{50}$ of 6.5 μm.

<Fixing Experiment>
<Evaluation of Pencil Hardness Test after Temporary Fixing>

Samples for fixing experiment are prepared in the following manner. Each of the resins prepared in the Examples and Comparative Examples is placed on paper to prepare an image area at a coverage of 0.45 mg/cm$^2$, which is then fixed upon being applied with a pressure of 25 MPa (250 kgf/cm$^2$). Thereafter, a pencil hardness test is carried out. Evaluation criteria are as follows.

A: The image area is not shaven by a pencil with a hardness of 4H.

B: The image area is not shaven by a pencil with a hardness of from 3H to HB.

C: The image area is not shaven by a pencil with a hardness of from B to 6B.

D: The image area is shaven by a pencil with a hardness of 6B.

<Evaluation of Pencil Hardness Test after Irradiation with Light; and Measurement of (Mn of the First Resin)/(Mn of the Second Resin)>

As to samples for experiment, each of the resins is placed on paper to prepare an image area, and an image is fixed at room temperature upon being applied with a pressure of 25 MPa (250 kgf/cm$^2$).

Thereafter, 1 part of ARONIX M211B (a modified diacrylate of BPA-EO) and 0.1 parts of a photopolymerization initiator (IRGACURE 819, manufactured by Ciba Specialty Chemicals) are diluted with THF, and the solution is sprayed in an amount of 0.05 mg/cm$^2$ on the image, followed by irradiation with UV for one second. The obtained sample is subjected to a pencil hardness test.

A: The image area is not shaven by a pencil with a hardness of 4H.

B: The image area is not shaven by a pencil with a hardness of from 3H to HB.

C: The image area is not shaven by a pencil with a hardness of from B to 6B.

D: The image area is shaven by a pencil with a hardness of 6B.

Also, the image area after irradiation with light is shaven off; a molecular weight is measured by means of GPC; and an increment is computed as an increment of the first resin. The measurement results of the {(Mn of the first resin)/(Mn of the second resin)} are shown in Table 1.

TABLE 1

| | | Example/Comparative Example | | | | | |
|---|---|---|---|---|---|---|---|
| | | Example 1 | Example 2 | Example 3 | Example 4 | Comparative Example 1 | Comparative Example 2 |
| Before irradiation with light | Baroplastic | Vinyl based | Polyester based | Vinyl based | Vinyl based | Vinyl based | Polyester based |
| | Presence or absence of photoreactive group | Yes | Yes | Yes | Yes | No | No |
| | Tg of first resin (° C.) | 96 | 120 | 96 | 96 | 96 | 120 |
| | Tg of second resin (° C.) | −50 | −40 | −50 | −50 | −50 | −40 |
| | (Mn of first resin)/(Mn of second resin) | 0.9 | 0.8 | 0.5 | 1.5 | 6.5 | 2.7 |
| | T(30 MPa) (° C.) | 68 | 42 | 60 | 90 | 121 | 90 |
| | T(1 MPa) (° C.) | 111 | 76 | 102 | 110 | 122 | 97 |
| | {T(1 MPa) − T(30 MPa)} (° C.) | 43 | 34 | 42 | 20 | 1 | 7 |
| After irradiation with light | (Mn of first resin)/(Mn of second resin) | 2.1 | 1.9 | 1.8 | 2.8 | 6.5 | 2.7 |
| | T(30 MPa) (° C.) | 113 | 80 | 108 | 118 | 121 | 90 |
| | T(1 MPa) (° C.) | 114 | 82 | 109 | 119 | 122 | 97 |
| | {T(1 MPa) − T(30 Mpa)} (° C.) | 1 | 2 | 1 | 1 | 1 | 7 |
| Evaluation of pencil hardness test | After temporary fixing | B | B | B | B | D | D |
| | After irradiation with light | A | A | A | A | D | D |

What is claimed is:

1. A baroplastic comprising:
a first resin with a first Tg in a range of from 90° C. to 200° C.; and
a second resin with a second Tg that is lower than the first Tg by 20° C. or more,
wherein
at least one of the first resin or the second resin is a homopolymer,
the first resin is noncrystalline,
the baroplastic has a photoreactive group, and
the baroplastic is a block copolymer having the first resin as one block and the second resin as another block.

2. The baroplastic according to claim 1, wherein the photoreactive group is a group having an ethylenically unsaturated group.

3. The baroplastic according to claim 1, wherein the first resin has the photoreactive group.

4. The baroplastic according to claim 1, which satisfies a relationship represented by the following expression (1):

$$20° C. \leq \{T(1\ MPa) - T(30\ MPa)\}° C. \quad (1)$$

wherein
T(1 MPa) represents a temperature at which a viscosity reaches $10^4$ Pa·s under an impressed pressure of flow tester of 1 MPa; and
T(30 MPa) represents a temperature at which a viscosity reaches $10^4$ Pa·s under an impressed pressure of flow tester of 30 MPa.

5. The baroplastic according to claim 1, wherein, with respect to a ratio of the block of the first resin and the block of the second resin, when a total weight of the block copolymer is defined as 100% by weight, a proportion for which the block of the first resin accounts is from about 25% by weight to about 75% by weight.

6. The baroplastic according to claim 5, wherein a raw material for synthesizing the block of the second resin contains an acrylic acid ester.

7. The baroplastic according to claim 1, wherein a number average molecular weight Mn of the block copolymer is from about 10,000 to about 150,000.

8. A resin composition comprising:
the baroplastic according to claim 1;
a photopolymerization initiator; and
a polymerizable compound which is reactive with the photoreactive group.

9. The resin composition according to claim 8, wherein
the baroplastic before irradiation with light satisfies a relationship of the following expression (2); and
the resin composition after irradiation with light satisfies a relationship of the following expression (3):

$$20° C. \leq \{T(1\ MPa) - T(30\ MPa)\}° C. \quad (2)$$

$$\{T(1\ MPa) - T(30\ MPa)\}° C. < 20° C. \quad (3)$$

wherein
T(1 MPa) represents a temperature at which a viscosity reaches $10^4$ Pa·s under an impressed pressure of flow tester of 1 MPa; and
T(30 MPa) represents a temperature at which a viscosity reaches $10^4$ Pa·s under an impressed pressure of flow tester of 30 MPa.

10. The resin composition according to claim 8, wherein
the baroplastic before irradiation with light satisfies a relationship of the following expression (4); and
the resin composition after irradiation with light satisfies a relationship of the following expression (5):

$$T(30\ MPa)° C. \leq 100° C. \quad (4)$$

$$100° C. < T(30\ MPa)° C. \quad (5)$$

wherein
T(30 MPa) represents a temperature at which a viscosity reaches $10^4$ Pa·s under an impressed pressure of flow tester of 30 MPa.

11. The resin composition according to claim 8, wherein
the first resin has the photoreactive group;
the first resin and the second resin before irradiation with light satisfy a relationship of the following expression (6); and the first resin and the second resin after irradiation with light satisfy a relationship of the following expression (7):

$$0.5 \leq \{(\text{Mn of the first resin})/(\text{Mn of the second resin})\} < 1.5 \quad (6)$$

$$1.5 \leq \{(\text{Mn of the first resin})/(\text{Mn of the second resin})\} \quad (7).$$

12. An electrostatic-image-developing toner comprising: the baroplastic according to claim 1.

13. The electrostatic-image-developing toner according to claim 12, wherein a content of the baroplastic is from about 50% by weight to about 99% by weight based on 100% by weight of the electrostatic-image-developing toner.

14. An electrostatic image developer comprising:
the electrostatic-image-developing toner according to claim 12; and
a carrier.

15. The electrostatic-image-developing toner according to claim 12, further comprising a photopolymerization initiator contained therein.

16. The baroplastic according to claim 1, wherein the block copolymer comprises an addition polymerization resin or a polycondensation resin.

17. The baroplastic according to claim 16, wherein the block copolymer comprises a polycondensation resin, and the polycondensation resin is a polyester.

18. An image forming method comprising:
charging an image holding member;
forming an electrostatic latent image on a surface of the image holding member;
developing the electrostatic latent image with a developer including a toner to form a toner image;
transferring the toner image onto a surface of a transfer-receiving material to obtain a transferred toner image;
temporarily fixing the transferred toner image by a pressure to form a temporarily fixed image;
feeding a polymerization initiator and a photopolymerizable compound to the temporarily fixed image to bring them into contact with each other; and
irradiating the temporarily fixed image with UV,
wherein
the developer is the electrostatic image developer according to claim 14, and
the irradiating of the temporarily fixed image with UV is polymerizing the baroplastic and the photopolymerizable compound upon being irradiated with UV to really fix the temporarily fixed image.

* * * * *